United States Patent
Feng et al.

(10) Patent No.: US 12,007,953 B2
(45) Date of Patent: Jun. 11, 2024

(54) PERFORMANCE ADJUSTING METHOD AND APPARATUS FOR FILE SYSTEM ARCHITECTURE

(71) Applicant: INSPUR SUZHOU INTELLIGENT TECHNOLOGY CO., LTD., Jiangsu (CN)

(72) Inventors: Yi Feng, Jiangsu (CN); Xinxiu Zhang, Jiangsu (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 17/918,922

(22) PCT Filed: Jan. 26, 2021

(86) PCT No.: PCT/CN2021/073698
§ 371 (c)(1),
(2) Date: Oct. 14, 2022

(87) PCT Pub. No.: WO2021/208560
PCT Pub. Date: Oct. 21, 2021

(65) Prior Publication Data
US 2023/0252002 A1 Aug. 10, 2023

(30) Foreign Application Priority Data
Apr. 17, 2020 (CN) .......................... 202010307772.5

(51) Int. Cl.
*G06F 16/182* (2019.01)
*G06F 16/17* (2019.01)

(52) U.S. Cl.
CPC ........ *G06F 16/183* (2019.01); *G06F 16/1734* (2019.01)

(58) Field of Classification Search
CPC .... G06F 16/183; G06F 16/1734; G06F 16/11; G06F 11/2273; H04L 41/0896
See application file for complete search history.

(56) References Cited

U.S. PATENT DOCUMENTS 7,246,171 B1 * 7/2007 Ambrose ................ H04L 67/06
370/468
9,152,603 B1 10/2015 Kelly, III
(Continued)

FOREIGN PATENT DOCUMENTS

CN      102291466 A    12/2011
CN      102404201 A    4/2012
(Continued)

OTHER PUBLICATIONS

International Search Report cited in PCT application PCT/CN2021/073698, mailed Apr. 28, 2021, 6 pages.
(Continued)

*Primary Examiner* — Mark D Featherstone
*Assistant Examiner* — Kweku William Halm
(74) *Attorney, Agent, or Firm* — Cooper Legal Group LLC (57) ABSTRACT

A performance adjusting method and apparatus for a file system architecture. The method includes: determining a plurality of internet bandwidths among a client, an Object Storage Server (OSS), and a storage controller in a file system architecture; determining an overall network architecture of the file system architecture and a maximum transmission bandwidth of the file system architecture; testing read-write performance of a single Object Storage Target (OST) to calculate an Input/Output (IO) processing capability of a storage node; determining whether the maximum transmission bandwidth matches the IO processing capability of the storage node to add or reduce a storage array accordingly to adjust a number of OSTs; executing a per-
(Continued)

formance benchmark test to determine IO read-write performance of the file system architecture; and determining whether the maximum transmission bandwidth matches the IO read-write performance to adjust a number of OSSs or a number of storage arrays accordingly.

17 Claims, 3 Drawing Sheets

(56) References Cited

U.S. PATENT DOCUMENTS

| | | | |
|---|---|---|---|
| 9,779,108 | B1 | 10/2017 | Faibish et al. |
| 2012/0269053 | A1* | 10/2012 | Yu .................. H04L 47/785 370/216 |
| 2015/0312126 | A1* | 10/2015 | Deshpande ...... H04L 67/1097 709/216 |
| 2017/0046075 | A1* | 2/2017 | Fuxa .................... G06F 3/0625 |
| 2020/0045648 | A1* | 2/2020 | Gupta .................. H04L 67/52 |

FOREIGN PATENT DOCUMENTS

| | | |
|---|---|---|
| CN | 105430096 A | 3/2016 |
| CN | 105912451 A | 8/2016 |
| CN | 110990369 A | 4/2020 |
| CN | 111506542 A | 8/2020 |

OTHER PUBLICATIONS

Written Opinion of International Searching Authority of corresponding PCT application PCT/CN2021/073698, mailed Apr. 28, 2021, 9 pages.

Notification to Grant Patent Right for Invention of corresponding CN priority application CN202010307772.5, mailed Jul. 27, 2022, 3 pages.

* cited by examiner

PERFORMANCE ADJUSTING METHOD AND APPARATUS FOR FILE SYSTEM ARCHITECTURE

This application claims priority to Chinese Patent Application No. 2020103077725, filed on Apr. 17, 2020, in China National Intellectual Property Administration and entitled "Performance Adjusting Method and Apparatus for File System Architecture", the contents of which are hereby incorporated by reference in its entirety.

FIELD

The present disclosure relates to the field of data storage, and more particularly to a performance adjusting method and apparatus for a file system architecture.

BACKGROUND

With the rapid development of information technology, information system has played an increasingly important role in key services of various industries. High Performance Computing (HPC) first demonstrated its transformation value for government and academic researchers in the early 1960s. In the late 1970s, HPC began to infiltrate first-class commercial companies and quickly became a reformer that promotes innovation, product design, and complex service processes. A parallel file system architecture Lustre for HPC is a cluster-oriented storage architecture as well as an open-source cluster (parallel) file system based on a Linux (an operating system) platform, which provides a file system interface compatible with a Portable Operating System Interface of UNIX (POSIX).

A high-performance network design of Lustre is a design in a state that a server, a storage device, and a network technology are updated. However, in many practical applications, not all servers and storage devices support high-speed networks. When old devices are used in an enterprise network, there may be multi-network coexistence, i.e., network heterogeneity, in practical application of the parallel file system Lustre. This makes data transmission channels in a service network (i.e., data transmission network) inconsistent in bandwidth, affecting the overall performance output of the system. In addition, it is not considered in a system performance evaluation and optimization method for Lustre that a service Input/Output (IO) processing flow of the file system Lustre between modules may change in a heterogeneous network. Since a storage controller is not connected to an IO network, a client is unable to access data directly from an Object Storage Target (OST) according to file layout information, i.e., a layout Extend Attribute (EA), but needs forwarding of an Object Storage Server (OSS), i.e., an IO node. Therefore, in case that the network is not a performance bandwidth bottleneck, extending a storage array connected with a storage controller may not improve the overall bandwidth capability of the system, namely achieving a minimum network bandwidth value between nodes.

For the problems of poor overall performance output and the impact on bandwidth brought by ignoring network heterogeneity in a parallel file system architecture in the prior art, there is yet no effective solution at present.

SUMMARY

In view of this, an objective of embodiments of the present disclosure is to disclose a performance adjusting method and apparatus for a file system architecture. The overall performance of a file system architecture may be optimized by means of reevaluation and adjustment based on actual situations of network heterogeneity and multi-network coexistence, so as to maximally obtain an output bandwidth close to a theoretical value.

Based on the above objective, a first aspect of the embodiments of the present disclosure provides a performance adjusting method for a file system architecture, including performing the following steps:
determining a plurality of internet bandwidths between every two of a client, an OSS, and a storage controller in a file system architecture;
determining an overall network architecture of the file system architecture, and determining a maximum transmission bandwidth of the file system architecture according to the plurality of internet bandwidths and the overall network architecture;
testing read-write performance of a single OST by means of an interface of the file system architecture to calculate an IO processing capability of a storage node of the file system architecture;
determining whether the maximum transmission bandwidth matches the IO processing capability of the storage node, and adding or reducing, in response to the fact that the maximum transmission bandwidth does not match the IO processing capability of the storage node, a storage array to adjust a number of OSTs, so as to make the maximum transmission bandwidth match the IO processing capability of the storage node;
executing a performance benchmark test on the file system architecture at the client to determine IO read-write performance of the file system architecture; and
determining whether the maximum transmission bandwidth matches the IO read-write performance, and adjusting, in response to the fact that the maximum transmission bandwidth does not match the IO read-write performance, a number of OSSs or a number of storage arrays according to the overall network architecture, so as to make the maximum transmission bandwidth match the IO read-write performance.

In some embodiments, the step of determining the overall network architecture of the file system architecture includes: determining whether the file system architecture is a heterogeneous network or a non-heterogeneous network.

The step of determining a maximum transmission bandwidth of the file system architecture according to the plurality of internet bandwidths and the overall network architecture includes: determining a minimum in the plurality of internet bandwidths in the file system architecture of the heterogeneous network as the maximum transmission bandwidth, and determining a unified value of the plurality of internet bandwidths in the file system architecture of the non-heterogeneous network as the maximum transmission bandwidth.

In some embodiments, the step of calculating the IO processing capability of the storage node of the file system architecture includes: determining a product of the read-write performance of the single OST and the number of OSTs in the file system architecture as the IO processing capability of the storage node.

The step of adding or reducing, in response to the fact that the maximum transmission bandwidth does not match the IO processing capability of the storage node, the storage array to adjust a number of OSTs includes: adding, in response to the fact that the maximum transmission bandwidth does not match and is significantly greater than the IO processing capability of the storage node, the storage array to increase the number of OSTs to further improve the IO processing capability of the storage node, and reducing, in response to the fact that the maximum transmission bandwidth does not match and is significantly less than the IO processing capability of the storage node, the storage array to reduce the number of OSTs to further reduce the IO processing capability of the storage node.

In some embodiments, the step of determining the overall network architecture of the file system architecture includes: determining whether the file system architecture is a heterogeneous network or a non-heterogeneous network.

The step of adjusting, in response to the fact that the maximum transmission bandwidth does not match the IO read-write performance, the number of OSSs or the number of storage arrays according to the overall network architecture includes: in response to the fact that the maximum transmission bandwidth does not match and is significantly greater than the IO read-write performance, increasing the number of OSSs in the file system architecture of the heterogeneous network to improve the IO read-write performance, and adding the storage controller and the storage array in the file system architecture of the non-heterogeneous network to improve the IO read/write performance.

In some embodiments, the step of adjusting the number of OSSs or the number of storage arrays according to the overall network architecture is performed only once, or repeated for many times until the maximum transmission bandwidth matches the IO read-write performance.

A second aspect of the embodiments of the present disclosure provides a performance adjusting apparatus for a file system architecture, including:

a processor; and a memory, storing a computer program executable by the processor. The computer program is executed to implement the following steps:

determining a plurality of internet bandwidths between every two of a client, an OSS, and a storage controller in a file system architecture;

determining an overall network architecture of the file system architecture, and determining a maximum transmission bandwidth of the file system architecture according to the plurality of internet bandwidths and the overall network architecture;

testing read-write performance of a single OST by means of an interface of the file system architecture to calculate an IO processing capability of a storage node of the file system architecture;

determining whether the maximum transmission bandwidth matches the IO processing capability of the storage node, and adding or reducing, in response to the fact that the maximum transmission bandwidth does not match the IO processing capability of the storage node, a storage array to adjust a number of OSTs, so as to make the maximum transmission bandwidth match the IO processing capability of the storage node;

executing a performance benchmark test on the file system architecture at the client to determine IO read-write performance of the file system architecture; and determining whether the maximum transmission bandwidth matches the IO read-write performance, and adjusting, in response to the fact that the maximum transmission bandwidth does not match the IO read-write performance, a number of OSSs or a number of storage arrays according to the overall network architecture, so as to make the maximum transmission bandwidth match the IO read-write performance.

In some embodiments, the determining an overall network architecture of the file system architecture includes: determining whether the file system architecture is a heterogeneous network or a non-heterogeneous network.

The step of determining a maximum transmission bandwidth of the file system architecture according to the plurality of internet bandwidths and the overall network architecture includes: determining a minimum in the plurality of internet bandwidths in the file system architecture of the heterogeneous network as the maximum transmission bandwidth, and determining a unified value of the plurality of internet bandwidths in the file system architecture of the non-heterogeneous network as the maximum transmission bandwidth.

In some embodiments, the calculating an IO processing capability of a storage node of the file system architecture includes: determining a product of the read-write performance of a single OST and the number of OSTs in the file system architecture as the IO processing capability of the storage node.

The adding or reducing, in response to the fact that the maximum transmission bandwidth does not match the IO processing capability of the storage node, a storage array to adjust a number of OSTs includes: adding, in response to the fact that the maximum transmission bandwidth does not match and is significantly greater than the IO processing capability of the storage node, the storage array to increase the number of OSTs to further improve the IO processing capability of the storage node, and reducing, in response to the fact that the maximum transmission bandwidth does not match and is significantly less than the IO processing capability of the storage node, the storage array to reduce the number of OSTs to further reduce the IO processing capability of the storage node.

In some embodiments, the step of determining the overall network architecture of the file system architecture includes: determining whether the file system architecture is a heterogeneous network or a non-heterogeneous network.

The step of adjusting, in response to the fact that the maximum transmission bandwidth does not match the IO read-write performance, the number of OSSs or the number of storage arrays according to the overall network architecture includes: in response to the fact that the maximum transmission bandwidth does not match and is significantly greater than the IO read-write performance, increasing the number of OSSs in the file system architecture of the heterogeneous network to improve the IO read-write performance, and adding the storage controller and the storage array in the file system architecture of the non-heterogeneous network to improve the IO read/write performance.

In some embodiments, the step of adjusting the number of OSSs or the number of storage arrays according to the overall network architecture is performed only once, or repeated for many times until the maximum transmission bandwidth matches the IO read-write performance.

The present disclosure has the following beneficial technical effects. According to the performance adjusting method and apparatus for a file system architecture in the embodiments of the present disclosure, a plurality of internet bandwidths between every two of a client, an OSS, and a storage controller in a file system architecture are determined. An overall network architecture of the file system architecture is determined, and a maximum transmission bandwidth of the file system architecture is determined according to the plurality of internet bandwidths and the overall network architecture. Read-write performance of a single OST is tested by means of an interface of the file system architecture to calculate an IO processing capability of a storage node of the file system architecture. Whether the maximum transmission bandwidth matches the IO processing capability of the storage node is determined, and a storage array is added or reduced, in response to the fact that the maximum transmission bandwidth does not match the IO processing capability of the storage node, to adjust a number of OSTs, so as to make the maximum transmission bandwidth match the IO processing capability of the storage node. A performance benchmark test is executed on the file system architecture at the client to determine IO read-write performance of the file system architecture. Whether the maximum transmission bandwidth matches the IO read-write performance is determined, and a number of OSSs or a number of storage arrays is adjusted according to the overall network architecture in response to the fact that the maximum transmission bandwidth does not match the IO read-write performance, so as to make the maximum transmission bandwidth match the IO read-write performance. With adoption of this technical solution, the overall performance of the file system architecture may be optimized by means of reevaluation and adjustment based on actual situations of network heterogeneity and multi-network coexistence, so as to maximally obtain an output bandwidth close to a theoretical value.

BRIEF DESCRIPTION OF THE DRAWINGS

In order to describe the technical solutions in the embodiments of the present disclosure or the prior art more clearly, the drawings required to be used in descriptions about the embodiments or the prior art will be introduced briefly below. Apparently, the drawings in the description below are only some embodiments of the present disclosure. Those ordinarily skilled in the art may further obtain other drawings according to these drawings without creative work.

DETAILED DESCRIPTION

In order to make the objective, technical solutions, and advantages of the present disclosure clearer, the embodiments of the present disclosure will further be described below in detail in combination with specific embodiments and with reference to the drawings.

It is to be noted that all expressions made with "first" and "second" in the embodiments of the present disclosure are for distinguishing two different entities or parameters with the same name, and thus it can be seen that "first" and "second" are only for ease of description and should not be understood as limitations on the embodiments of the present disclosure. No descriptions are made thereto in the following embodiments.

Figure 1:
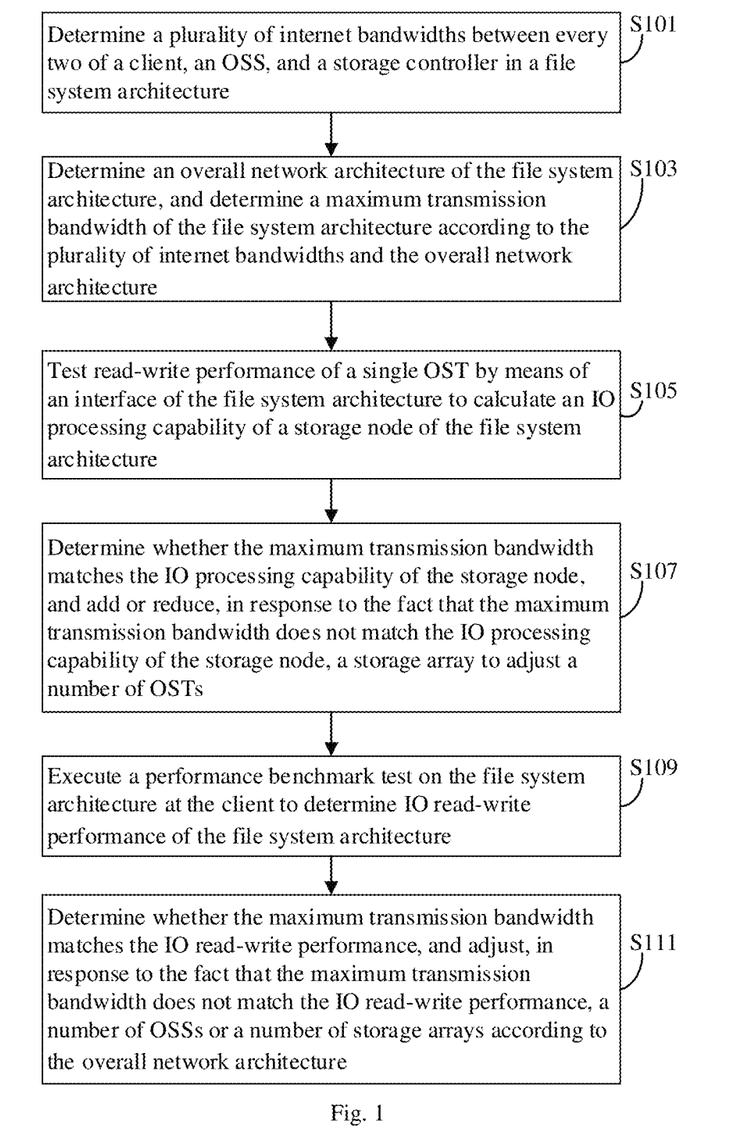
FIG. 1 is a schematic flowchart of a performance adjusting method for a file system architecture according to the present disclosure.

Based on the above objective, a first aspect of the embodiments of the present disclosure discloses an embodiment of a performance adjusting method for a file system architecture. According to the method, the overall performance of a file system architecture may be optimized by means of reevaluation and adjustment based on actual situations of network heterogeneity and multi-network coexistence. FIG. 1 is a schematic flowchart of a performance adjusting method for a file system architecture according to the present disclosure.

As shown in FIG. 1, the performance adjusting method for a file system architecture includes performing the following steps.

In step S101, a plurality of internet bandwidths between every two of a client, an OSS, and a storage controller in a file system architecture are determined.

In step S103, an overall network architecture of the file system architecture is determined, and a maximum transmission bandwidth of the file system architecture is determined according to the plurality of internet bandwidths and the overall network architecture.

In step S105, read-write performance of a single OST is tested by means of an interface of the file system architecture to calculate an IO processing capability of a storage node of the file system architecture.

In step S107, whether the maximum transmission bandwidth matches the IO processing capability of the storage node is determined, and a storage array is added or reduced, in response to the fact that the maximum transmission bandwidth does not match the IO processing capability of the storage node, to adjust a number of OSTs, so as to make the maximum transmission bandwidth match the IO processing capability of the storage node.

In step S109, a performance benchmark test is executed on the file system architecture at the client to determine IO read-write performance of the file system architecture.

In step S111, whether the maximum transmission bandwidth matches the IO read-write performance is determined, and a number of OSSs or a number of storage arrays is adjusted according to the overall network architecture in response to the fact that the maximum transmission bandwidth does not match the IO read-write performance, so as to make the maximum transmission bandwidth match the IO read-write performance.

It can be understood by those ordinarily skilled in the art that all or part of the processes in the method of the above-mentioned embodiment may be completed by a computer program by instructing related hardware. The program may be stored in a computer-readable storage medium. When the program is executed, the processes of each method embodiment may be included. The storage medium may be a magnetic disk, an optical disk, a Read-Only Memory (ROM), a Random Access Memory (RAM), etc. The embodiment of the computer program may have effects the same as or similar to those in any corresponding method embodiment.

In some embodiments, the operation that an overall network architecture of the file system architecture is determined includes that: it is determined whether the file system architecture is a heterogeneous network or a non-heterogeneous network. The operation that a maximum transmission bandwidth of the file system architecture is determined according to the plurality of internet bandwidths and the overall network architecture includes that: the minimum in the plurality of internet bandwidths in the file system architecture of the heterogeneous network is determined as the maximum transmission bandwidth, and a unified value of the plurality of internet bandwidths in the file system architecture of the non-heterogeneous network is determined as the maximum transmission bandwidth.

In some embodiments, the operation that an IO processing capability of a storage node of the file system architecture is calculated includes that: a product of the read-write performance of a single OST and the number of OSTs in the file system architecture is determined as the IO processing capability of the storage node. The operation that a storage array is added or reduced, in response to the fact that the maximum transmission bandwidth does not match the IO processing capability of the storage node, to adjust a number of OSTs includes that: the storage array is added, in response to the fact that the maximum transmission bandwidth does not match and is significantly greater than the IO processing capability of the storage node, to increase the number of OSTs to further improve the IO processing capability of the storage node, and the storage array is reduced, in response to the fact that the maximum transmission bandwidth does not match and is significantly less than the IO processing capability of the storage node, to reduce the number of OSTs to further reduce the IO processing capability of the storage node.

In some embodiments, the operation that an overall network architecture of the file system architecture is determined includes that: it is determined whether the file system architecture is a heterogeneous network or a non-heterogeneous network. The operation that a number of OSSs or a number of storage arrays is adjusted according to the overall network architecture in response to the fact that the maximum transmission bandwidth does not match the IO read-write performance includes that: in response to the fact that the maximum transmission bandwidth does not match and is significantly greater than the IO read-write performance, the number of OSSs in the file system architecture of the heterogeneous network is increased to improve the IO read-write performance, and the storage controller and the storage array are added in the file system architecture of the non-heterogeneous network to improve the IO read/write performance.

In some embodiments, the step of adjusting the number of OSSs or the number of storage arrays according to the overall network architecture is performed only once, or repeated for many times until the maximum transmission bandwidth matches the IO read-write performance.

The method disclosed according to the embodiment of the present disclosure may also be implemented as a computer program executed by a Graphics Processing Unit (GPU). The computer program may be stored in a computer-readable storage medium. When the computer program is executed by the GPU, the functions defined in the method disclosed in the embodiment of the present disclosure are executed. The above method steps and system units may also be implemented by a controller and a computer-readable storage medium configured to store a computer program that enables the controller to implement the steps or functions of the units.

Figure 2:
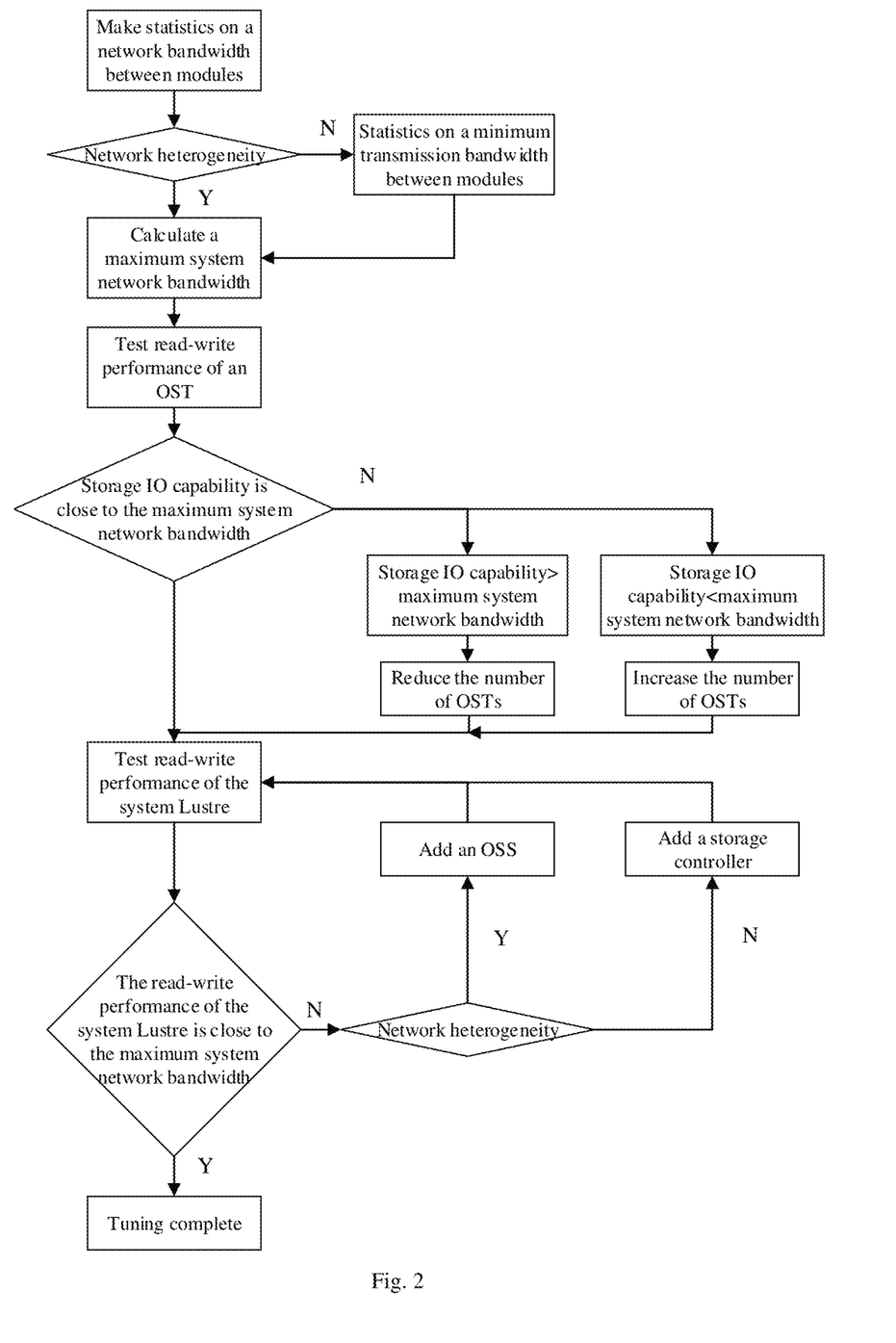
FIG. 2 is a detailed flowchart of an embodiment of a performance adjusting method for a file system architecture according to the present disclosure.

A specific embodiment of the present disclosure will further be described below according to a specific embodiment shown in FIG. 2.

Since a Metadata Server (MDS) responsible for metadata management and transmission with a small data transmission volume has relatively high requirements for power and memory capacity of a CPU as well as fast disk storage but a low network bandwidth requirement, no statistics is made to a network bandwidth of a transmission channel for interaction with the MDS. In addition, for ease of description, it is assumed in this solution that each module in the system is the same in number, namely the number of client nodes, the number of OSS s, and the number of controller ports are the same.

An optimal solution includes the following steps.

In step 1, a network bandwidth on a transmission channel between modules is calculated according to a network architecture of the system Lustre. Here, bw_Client_OSS represents a network bandwidth between a client and an OSS, bw_OSS_Control represents a network bandwidth between the OSS and a storage controller, and bw_Control_Client represents a network bandwidth between the storage controller and the client.

In step 2, whether the system is a heterogeneous network is determined, and a maximum system network transmission bandwidth is calculated. Network transmission bandwidths between modules of a heterogeneous network are consistent. A minimum network transmission bandwidth value between the modules of the heterogeneous network is the maximum system network transmission bandwidth. If bw_System_max represents the maximum system network transmission bandwidth, there is:

bw_System_max=min[bw_Client_OSS, bw_OS S_Control, bw_Control_Client].

In step 3, an obdfilter-survey (a file system test) script is executed to call a Lustre file system interface OBDfilter (OST access interface implemented by the file system Lustre) to perform a performance test on an OST in the system to obtain read-write performance of a single OST. The OST is a basic unit with a storage capability in the system.

In step 4, an IO processing capability of a storage node of the system is calculated based on the read-write performance of a single OST, and whether the IO processing capability of the storage node matches the maximum system network transmission bandwidth is determined. Here, bw_Storage represents the IO processing capability of the storage node of the system, bw_OST represents the read-write performance of a single OST, and cont_OST represents the number of OSTs in the system. There is:

bw_Storage=bw_OST×cont_OST.

In step 5, if the IO processing capability of the storage node of the system does not match the maximum system network transmission bandwidth, the number of storage nodes in the system is adjusted such that node resources are fully used and an overall bandwidth of the system is optimal. In case of bw_Storage<bw_System_max, the number of OSTs in the system is increased, which may be implemented by adding a storage array. In case of bw_Storage>bw_System_max, the number of OSTs in the system is reduced, which may be implemented by reducing a storage array.

In step 6, the client initiates an IO test request to Lustre by means of a file system parallel testing tool (such as Message-Passing-Interface (MPI)) to execute a performance benchmark test and obtain an IO read-write performance value of the file system Lustre.

In step 7, whether the IO read-write performance value of the file system Lustre is close to the maximum system network transmission bandwidth is determined. If the IO read-write performance value of the file system Lustre is less than the maximum system network transmission bandwidth, the following tuning steps are performed.

If the storage controller and the client are in a heterogeneous network, the client is unable to access data directly from the OST according to file layout information, i.e., a layout EA, but needs forwarding of an OSS, i.e., an IO node. In such case, an IO data forwarding capability of the OSS may become a bottleneck of the overall system performance.

Therefore, it is necessary to increase the number of OSSs to meet a requirement for data IO forwarding capability of the whole system.

If the storage controller and the client are in the same high-speed network (non-heterogeneous network), the client is able to access data directly from the OST according to file layout information, i.e., the layout EA. Since the IO processing capability of the storage node matches the maximum system network transmission bandwidth, an IO processing capability of the storage controller becomes a bottleneck of the overall system performance. The IO processing capability of the storage controller is determined by hardware and software provided by each storage manufacturer, including a bandwidth of a Serial Attached Small Computer System Interface (SCSI) (SAS) (a computer line concentration technology) connection channel of a back-plane of a storage enclosure, and a connection mode. Therefore, the overall system performance may be improved only by adding the storage controller and the storage array.

In step 8, steps 6 and 7 are repeated until the IO read-write performance value of the file system Lustre is close to the maximum system network transmission bandwidth and the overall system performance is optimal.

It can be seen from the above-mentioned embodiment that, according to the performance adjusting method for a file system architecture in the embodiment of the present disclosure, a plurality of internet bandwidths between every two of a client, an OSS, and a storage controller in a file system architecture are determined. An overall network architecture of the file system architecture is determined, and a maximum transmission bandwidth of the file system architecture is determined according to the plurality of internet bandwidths and the overall network architecture. Read-write performance of a single OST is tested by means of an interface of the file system architecture to calculate an IO processing capability of a storage node of the file system architecture. Whether the maximum transmission bandwidth matches the IO processing capability of the storage node is determined, and a storage array is added or reduced, in response to the fact that the maximum transmission bandwidth does not match the IO processing capability of the storage node, to adjust a number of OSTs, so as to make the maximum transmission bandwidth match the IO processing capability of the storage node. A performance benchmark test is executed on the file system architecture at the client to determine IO read-write performance of the file system architecture. Whether the maximum transmission bandwidth matches the IO read-write performance is determined, and a number of OSSs or a number of storage arrays is adjusted according to the overall network architecture in response to the fact that the maximum transmission bandwidth does not match the IO read-write performance, so as to make the maximum transmission bandwidth match the IO read-write performance With adoption of this technical solution, the overall performance of the file system architecture may be optimized by means of reevaluation and adjustment based on actual situations of network heterogeneity and multi-network coexistence, so as to maximally obtain an output bandwidth close to a theoretical value.

It is to be particularly pointed out that the steps in each embodiment of the performance adjusting method for a file system architecture may be mutually intersected, replaced, added, and deleted. Therefore, these reasonable permutations, combinations, and transformations about the performance adjusting method for a file system architecture shall also fall within the scope of protection of the present disclosure, and the scope of protection of the present disclosure should not be limited to the embodiments.

Figure 3:
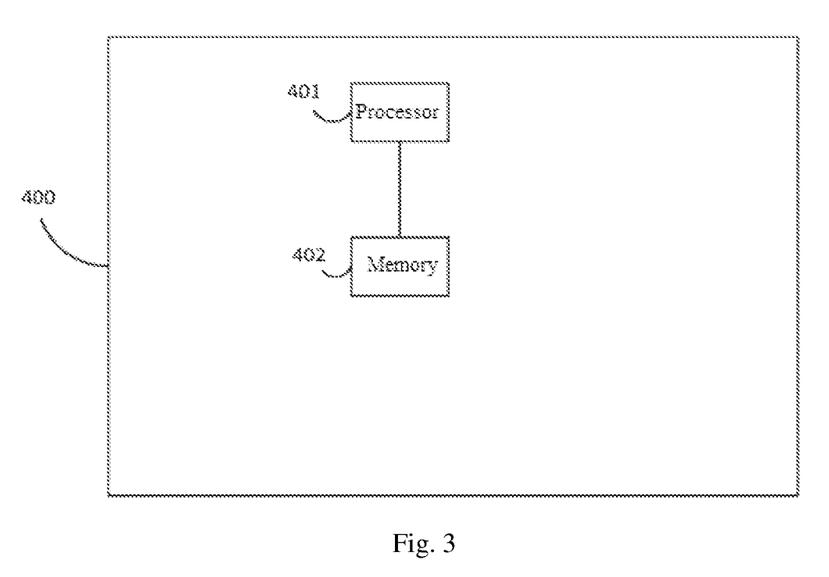
FIG. 3 is a schematic diagram of a performance adjusting apparatus for a file system architecture according to the present disclosure.

Based on the above objective, a second aspect of the embodiments of the present disclosure discloses an embodiment of a performance adjusting apparatus 400 for a file system architecture, which may optimize the overall performance of a file system architecture by means of reevaluation and adjustment based on actual situations of network heterogeneity and multi-network coexistence, as shown in FIG. 3. The performance adjusting apparatus 400 includes:
- a processor 401; and
- a memory 402, storing a computer program executable by the processor 401. The program code is executed to implement the following steps:
  - determining a plurality of internet bandwidths between every two of a client, an OSS, and a storage controller in a file system architecture;
  - determining an overall network architecture of the file system architecture, and determining a maximum transmission bandwidth of the file system architecture according to the plurality of internet bandwidths and the overall network architecture;
  - testing read-write performance of a single OST by means of an interface of the file system architecture to calculate an IO processing capability of a storage node of the file system architecture;
  - determining whether the maximum transmission bandwidth matches the IO processing capability of the storage node, and adding or reducing, in response to the fact that the maximum transmission bandwidth does not match the IO processing capability of the storage node, a storage array to adjust a number of OSTs, so as to make the maximum transmission bandwidth match the IO processing capability of the storage node;
  - executing a performance benchmark test on the file system architecture at the client to determine IO read-write performance of the file system architecture; and
  - determining whether the maximum transmission bandwidth matches the IO read-write performance, and adjusting, in response to the fact that the maximum transmission bandwidth does not match the IO read-write performance, a number of OSSs or a number of storage arrays according to the overall network architecture, so as to make the maximum transmission bandwidth match the IO read-write performance.

In some embodiments, the step of determining an overall network architecture of the file system architecture includes: determining whether the file system architecture is a heterogeneous network or a non-heterogeneous network. The determining a maximum transmission bandwidth of the file system architecture according to the plurality of internet bandwidths and the overall network architecture includes: determining the minimum in the plurality of internet bandwidths in the file system architecture of the heterogeneous network as the maximum transmission bandwidth, and determining a unified value of the plurality of internet bandwidths in the file system architecture of the non-heterogeneous network as the maximum transmission bandwidth.

In some embodiments, the step of calculating an IO processing capability of a storage node of the file system architecture includes: determining a product of the read-write performance of a single OST and the number of OSTs in the file system architecture as the IO processing capability of the storage node. The adding or reducing, in response to the fact that the maximum transmission bandwidth does not match the IO processing capability of the storage node, a storage array to adjust a number of OSTs includes: adding, in response to the fact that the maximum transmission bandwidth does not match and is significantly greater than the IO processing capability of the storage node, the storage array to increase the number of the OSTs to further improve the IO processing capability of the storage node, and reducing, in response to the fact that the maximum transmission bandwidth does not match and is significantly less than the IO processing capability of the storage node, the storage array to reduce the number of the OSTs to further reduce the IO processing capability of the storage node.

In some embodiments, the step of determining an overall network architecture of the file system architecture includes: determining that the file system architecture is a heterogeneous network or a non-heterogeneous network. The adjusting, in response to the fact that the maximum transmission bandwidth does not match the IO read-write performance, a number of OSSs or a number of storage arrays according to the overall network architecture includes: in response to the fact that the maximum transmission bandwidth does not match and is significantly greater than the IO read-write performance, increasing the number of OSSs in the file system architecture of the heterogeneous network to improve the IO read-write performance, and adding the storage controller and the storage array in the file system architecture of the non-heterogeneous network to improve the IO read/write performance.

In some embodiments, the step of adjusting the number of OSSs or the number of storage arrays according to the overall network architecture is performed only once, or repeated for many times until the maximum transmission bandwidth matches the IO read-write performance.

It can be seen from the above-mentioned embodiment that, according to the performance adjusting apparatus 400 for a file system architecture in the embodiment of the present disclosure, a plurality of internet bandwidths between every two of a client, an OSS, and a storage controller in a file system architecture are determined. An overall network architecture of the file system architecture is determined, and a maximum transmission bandwidth of the file system architecture is determined according to the plurality of internet bandwidths and the overall network architecture. Read-write performance of a single OST is tested by means of an interface of the file system architecture to calculate an IO processing capability of a storage node of the file system architecture. Whether the maximum transmission bandwidth matches the IO processing capability of the storage node is determined, and a storage array is added or reduced, in response to the fact that the maximum transmission bandwidth does not match the IO processing capability of the storage node, to adjust a number of OSTs, so as to make the maximum transmission bandwidth match the IO processing capability of the storage node. A performance benchmark test is executed on the file system architecture at the client to determine IO read-write performance of the file system architecture. Whether the maximum transmission bandwidth matches the IO read-write performance is determined, and a number of OSSs or a number of storage arrays is adjusted according to the overall network architecture in response to the fact that the maximum transmission bandwidth does not match the IO read-write performance, so as to make the maximum transmission bandwidth match the IO read-write performance. With adoption of this technical solution, the overall performance of the file system architecture may be optimized by means of reevaluation and adjustment based on actual situations of network heterogeneity and multi-network coexistence, so as to maximally obtain an output bandwidth close to a theoretical value.

It is to be particularly pointed out that a working process of each module is described in the embodiment of the performance adjusting apparatus 400 for a file system architecture with the embodiment of the performance adjusting method for a file system architecture, and application of these modules to other embodiments of the performance adjusting method for a file system architecture is apparent to those skilled in the art. Certainly, the steps in the embodiment of the performance adjusting apparatus for a file system architecture may be mutually intersected, replaced, added, and deleted. Therefore, these reasonable permutations, combinations, and transformations about the performance adjusting apparatus for a file system architecture shall also fall within the scope of protection of the present disclosure, and the scope of protection of the present disclosure should not be limited to the embodiments.

The above is the exemplary embodiment disclosed in the present disclosure. However, it is to be noted that various variations and modifications may be made without departing from the scope defined in the claims and disclosed in the embodiments of the present disclosure. The functions, steps, and/or actions in the method claims according to the disclosed embodiments described herein are not required to be executed in any specific sequence. In addition, the element disclosed in the embodiments of the present disclosure may be described or required in an individual form, but may be understood as a plural form, unless clearly limited to a singular form.

It is to be understood that, as used herein, the singular form "a/an" is intended to include the plural form also, unless exceptional cases are supported clearly in the context. It is also to be understood that "and/or" used herein refers to including any or all possible combinations of one or more than one item that is listed associatively. The sequence numbers of the embodiments of the present disclosure are only for description and do not represent superiority-inferiority of the embodiments.

It can be understood by those ordinarily skilled in the art that all or part of the steps of the above-mentioned embodiments may be completed by hardware, or by a computer by instructing related hardware. The program may be stored in a computer-readable storage medium. The storage medium may be a ROM, a magnetic disk, an optical disk, etc.

It is to be understood by those ordinarily skilled in the art that discussions about any above embodiment are only exemplary and not intended to imply that the scope (including the claims) disclosed in the embodiments of the present disclosure is limited to these examples. Under the concept of the embodiments of the present disclosure, the above embodiments or technical features in different embodiments may also be combined, and there are many other variations of different aspects of the embodiments of the present disclosure as described above, which are not provided in details for brevity. Therefore, any omissions, modifications, equivalent replacements, improvements, etc., made within the spirit and principle of the embodiments of the present disclosure shall fall within the scope of protection of the embodiments of the present disclosure.

What is claimed is:

1. A performance adjusting method for a file system architecture, comprising:
   determining a plurality of internet bandwidths between every two of a client, an Object Storage Server (OSS), and a storage controller in a file system architecture;
   determining an overall network architecture of the file system architecture, and determining a maximum transmission bandwidth of the file system architecture according to the plurality of internet bandwidths and the overall network architecture, wherein the step of determining the overall network architecture of the file system architecture comprises: determining whether the file system architecture is a heterogeneous network or a non-heterogeneous network; and wherein the step of determining the maximum transmission bandwidth of the file system architecture according to the plurality of internet bandwidths and the overall network architecture comprises: determining a minimum in the plurality of internet bandwidths in the file system architecture of the heterogeneous network as the maximum transmission bandwidth, and determining a unified value of the plurality of internet bandwidths in the file system architecture of the non-heterogeneous network as the maximum transmission bandwidth;
   testing read-write performance of a single Object Storage Target (OST) by means of an interface of the file system architecture to calculate an Input/Output (IO) processing capability of a storage node of the file system architecture;
   determining whether the maximum transmission bandwidth matches the IO processing capability of the storage node, and adding or reducing, in response to the maximum transmission bandwidth not matching the IO processing capability of the storage node, a storage array to adjust a number of OSTs, so as to make the maximum transmission bandwidth match the IO processing capability of the storage node;
   executing a performance benchmark test on the file system architecture at the client to determine IO read-write performance of the file system architecture; and
   determining whether the maximum transmission bandwidth matches the IO read-write performance, and adjusting, in response to the maximum transmission bandwidth not matching the IO read-write performance, a number of OSSs or a number of storage arrays according to the overall network architecture, so as to make the maximum transmission bandwidth match the IO read-write performance.

2. The method according to claim 1, wherein the step of calculating the IO processing capability of the storage node of the file system architecture comprises: determining a product of the read-write performance of the single OST and the number of OSTs in the file system architecture as the IO processing capability of the storage node; and
   the step of adding or reducing, in response to the maximum transmission bandwidth not matching the IO processing capability of the storage node, the storage array to adjust the number of OSTs comprises: adding, in response to the maximum transmission bandwidth not matching and being greater than the IO processing capability of the storage node, the storage array to increase the number of OSTs to further improve the IO processing capability of the storage node.

3. The method according to claim 1, wherein the step of adjusting, in response to the fact that the maximum transmission bandwidth not matching the IO read-write performance, the number of OSSs or the number of storage arrays according to the overall network architecture comprises: in response to the maximum transmission bandwidth not matching and being greater than the IO read-write performance, increasing the number of OSSs in the file system architecture of the heterogeneous network to improve the IO read-write performance, and adding the storage controller and the storage array in the file system architecture of the non-heterogeneous network to improve the IO read-write performance.

4. The method according to claim 3, wherein the step of adjusting the number of OSSs or the number of storage arrays according to the overall network architecture is performed only once.

5. A performance adjusting apparatus for a file system architecture, comprising:
   a processor; and
   a memory, storing a computer program executable by the processor, wherein the computer program is executed to cause the processor to:
   determine a plurality of internet bandwidths between every two of a client, an Object Storage Server (OSS), and a storage controller in a file system architecture;
   determine an overall network architecture of the file system architecture, and determine a maximum transmission bandwidth of the file system architecture according to the plurality of internet bandwidths and the overall network architecture, wherein the processor is caused to determine the overall network architecture of the file system architecture by determining whether the file system architecture is a heterogeneous network or a non-heterogeneous network; and wherein the processor is caused to determine the maximum transmission bandwidth of the file system architecture according to the plurality of internet bandwidths and the overall network architecture by determining a minimum in the plurality of internet bandwidths in the file system architecture of the heterogeneous network as the maximum transmission bandwidth, and determining a unified value of the plurality of internet bandwidths in the file system architecture of the non-heterogeneous network as the maximum transmission bandwidth;
   test read-write performance of a single Object Storage Target (OST) by means of an interface of the file system architecture to calculate an Input/Output (IO) processing capability of a storage node of the file system architecture;
   determine whether the maximum transmission bandwidth matches the IO processing capability of the storage node, and add or reduce, in response to the maximum transmission bandwidth not matching the IO processing capability of the storage node, a storage array to adjust a number of OSTs, so as to make the maximum transmission bandwidth match the IO processing capability of the storage node;
   execute a performance benchmark test on the file system architecture at the client to determine IO read-write performance of the file system architecture; and
   determine whether the maximum transmission bandwidth matches the IO read-write performance, and adjust, in response to the maximum transmission bandwidth not matching the IO read-write performance, a number of OSSs or a number of storage arrays according to the overall network architecture, so as to make the maximum transmission bandwidth match the IO read-write performance.

6. The apparatus according to claim 5, wherein the step of calculating the IO processing capability of the storage node of the file system architecture comprises: determining a product of the read-write performance of the single OST and the number of OSTs in the file system architecture as the IO processing capability of the storage node; and the step of adding or reducing, in response to the maximum transmission bandwidth not matching the IO processing capability of the storage node, the storage array to adjust the number of OSTs comprises: adding, in response to the maximum transmission bandwidth not matching and being greater than the IO processing capability of the storage node, the storage array to increase the number of OSTs to further improve the IO processing capability of the storage node.

7. The apparatus according to claim 5, wherein the step of adjusting, in response to the maximum transmission bandwidth not matching the IO read-write performance, the number of OSSs or the number of storage arrays according to the overall network architecture comprises: in response to the maximum transmission bandwidth not matching and being greater than the IO read-write performance, increasing the number of OSSs in the file system architecture of the heterogeneous network to improve the IO read-write performance, and adding the storage controller and the storage array in the file system architecture of the non-heterogeneous network to improve the IO read-write performance.

8. The apparatus according to claim 7, wherein the step of adjusting the number of OSSs or the number of storage arrays according to the overall network architecture is performed only once.

9. The method according to claim 2, wherein the step of adding or reducing, in response to the maximum transmission bandwidth not matching the IO processing capability of the storage node, the storage array to adjust the number of OSTs comprises:

reducing, in response to the fact that the maximum transmission bandwidth-does not matching and being is less than the IO processing capability of the storage node, the storage array to reduce the number of OSTs to further reduce the IO processing capability of the storage node.

10. The method according to claim 3, wherein the step of adjusting the number of OSSs or the number of storage arrays according to the overall network architecture is repeated until the maximum transmission bandwidth matches the IO read-write performance.

11. The apparatus according to claim 6, wherein the step of adding or reducing, in response to the maximum transmission bandwidth not matching the IO processing capability of the storage node, the storage array to adjust the number of OSTs comprises:

reducing, in response to the maximum transmission bandwidth not matching and being less than the IO processing capability of the storage node, the storage array to reduce the number of OSTs to further reduce the IO processing capability of the storage node.

12. The apparatus according to claim 7, wherein the step of adjusting the number of OSSs or the number of storage arrays according to the overall network architecture is repeated until the maximum transmission bandwidth matches the IO read-write performance.

13. A non-transitory computer-readable storage medium, storing a computer program that is executable by a processor, and upon execution by the processor, is configured to cause the processor to:

determine a plurality of internet bandwidths between every two of a client, an Object Storage Server (OSS), and a storage controller in a file system architecture;

determine an overall network architecture of the file system architecture, and determine a maximum transmission bandwidth of the file system architecture according to the plurality of internet bandwidths and the overall network architecture, wherein the processor is caused to determine the overall network architecture of the file system architecture by determining whether the file system architecture is a heterogeneous network or a non-heterogeneous network; and wherein the processor is caused to determine the maximum transmission bandwidth of the file system architecture according to the plurality of internet bandwidths and the overall network architecture by determining a minimum in the plurality of internet bandwidths in the file system architecture of the heterogeneous network as the maximum transmission bandwidth, and determining a unified value of the plurality of internet bandwidths in the file system architecture of the non-heterogeneous network as the maximum transmission bandwidth;

test read-write performance of a single Object Storage Target (OST) by means of an interface of the file system architecture to calculate an Input/Output (IO) processing capability of a storage node of the file system architecture;

determine whether the maximum transmission bandwidth matches the IO processing capability of the storage node, and add or reduce, in response to the maximum transmission bandwidth not matching the IO processing capability of the storage node, a storage array to adjust a number of OSTs, so as to make the maximum transmission bandwidth match the IO processing capability of the storage node;

execute a performance benchmark test on the file system architecture at the client to determine IO read-write performance of the file system architecture; and determine whether the maximum transmission bandwidth matches the IO read-write performance, and adjust, in response to the maximum transmission bandwidth not matching the IO read-write performance, a number of OSSs or a number of storage arrays according to the overall network architecture, so as to make the maximum transmission bandwidth match the IO read-write performance.

14. The non-transitory computer-readable storage medium according to claim 13, wherein the computer program, upon execution by the processor, is further configured to cause the processor to:

determine a product of the read-write performance of the single OST and the number of OSTs in the file system architecture as the IO processing capability of the storage node; and add, in response to the maximum transmission bandwidth not matching and being greater than the IO processing capability of the storage node, the storage array to increase the number of OSTs to further improve the IO processing capability of the storage node.

15. The non-transitory computer-readable storage medium according to claim 14, wherein the computer program, upon execution by the processor, is further configured to cause the processor to:
  reduce, in response to the maximum transmission bandwidth not matching and being less than the IO processing capability of the storage node, the storage array to reduce the number of OSTs to further reduce the IO processing capability of the storage node.

16. The non-transitory computer-readable storage medium according to claim 13, wherein the computer program, upon execution by the processor, is further configured to cause the processor to:
  in response to the maximum transmission bandwidth not matching and being greater than the IO read-write performance, increase the number of OSSs in the file system architecture of the heterogeneous network to improve the IO read-write performance, and add the storage controller and the storage array in the file system architecture of the non-heterogeneous network to improve the IO read-write performance.

17. The non-transitory computer-readable storage medium according to claim 16, wherein the computer program, upon execution by the processor, is further configured to cause the processor to:
  adjust the number of OSSs or the number of storage arrays according to the overall network architecture only once, or adjust the number of OSSs or the number of storage arrays until the maximum transmission bandwidth matches the IO read-write performance.

* * * * *